US005532449A

United States Patent [19]

Murakami

[11] Patent Number: 5,532,449

[45] Date of Patent: Jul. 2, 1996

[54] USING PLASMA ARC AND THERMITE TO DEMOLISH CONCRETE

[75] Inventor: Taku Murakami, Hiratsuka, Japan

[73] Assignee: Kabushiki Kaisha Komatsu Seisakusho, Tokyo, Japan

[21] Appl. No.: 297,610

[22] Filed: Aug. 29, 1994

[30] Foreign Application Priority Data

Aug. 30, 1993 [JP] Japan .................................... 5-238920

[51] Int. Cl.[6] .................................................. B23K 10/00

[52] U.S. Cl. ................................ 219/121.59; 219/121.44; 219/121.38; 219/121.48; 219/70; 266/48

[58] Field of Search ................................ 219/70, 121.38, 219/121.36, 121.48, 121.51, 121.37, 121.59, 121.44; 266/48–52, 905, 904

[56] References Cited

U.S. PATENT DOCUMENTS

| | | | |
|---|---|---|---|
| 3,740,522 | 6/1973 | Muehlberger | 219/76 |
| 3,988,566 | 10/1976 | Vogts et al. | 219/121.54 |
| 4,371,771 | 2/1983 | Faccini et al. | 219/70 |
| 4,477,060 | 10/1984 | Molinder | 266/48 |
| 4,541,616 | 9/1985 | Dean | 266/48 |
| 4,559,890 | 12/1985 | Regalbuto et al. | 114/230 |
| 4,766,284 | 8/1988 | Cavanagh | 219/121.59 |

FOREIGN PATENT DOCUMENTS

| | | |
|---|---|---|
| 48-67414 | 9/1973 | Japan . |
| 55-145294 | 11/1980 | Japan . |

*Primary Examiner*—Mark H. Paschall
*Attorney, Agent, or Firm*—Richards, Medlock & Andrews

[57] ABSTRACT

A plasma arc can be employed to demolish a concrete structure at a high efficiency, while preventing a secondary problem due to noise, flying dust and chips, and the like. The concrete structure can be demolished by melting a surface of the concrete structure by generating a plasma arc from a plasma torch (15) of a plasma arc generator, mixing thermite powder (T) with a supply gas (Gc) for the plasma torch (15), directing the plasma arc at the surface of the concrete structure, and controlling the rate of supply of the thermite powder (T) to the plasma torch (15) in response to the operation of the plasma arc, including initiating and stopping the supply of the thermite powder (T) to the plasma torch (15) in a manner coordinated with the initiation and stoppage of the plasma arc, thereby controlling the heat generated by the thermite reaction, and melting the surface of the concrete structure. The plasma generator (1) can be provided with a feeder (20) for mixing the thermite powder (T) with the supply gas (Gc), and controller (30) for controlling the rate of supply of the thermite powder (T) or for stopping the supply of the thermite powder (T).

15 Claims, 3 Drawing Sheets

USING PLASMA ARC AND THERMITE TO DEMOLISH CONCRETE

FIELD OF THE INVENTION

The present invention relates to an improvement in method and apparatus for demolishing concrete structures. In a specific aspect, the invention relates to method and apparatus for melting concrete.

BACKGROUND OF THE INVENTION

Concrete structures used to be considered semi-permanent. However, in recent times, it has become popular to demolish and then rebuild concrete structures for reasons of deterioration, out-of-date conditions, economic disadvantages, and the like. In this connection, various methods and apparatus for demolishing concrete structures have been proposed.

For example, such proposed methods for demolishing concrete structures include: an impact demolition method using hammers and chisels, impact breakers, steel balls, or the like; a mechanical demolition method using lock jacks, crushers, cutters, drills, or the like; a thermite demolition method using metallic-wire thermite, thermite moldings (refer to Japanese Patent Application Laid-Open No. 48-67414), or the like; a flame demolition method using jet flame or the like; an explosive demolition method; a gas expansion demolition method; an electrical demolition method using arc discharge, laser, plasma arc (refer to Japanese Patent Application Laid-open No. 55-145294), or the like; and a jet demolition method using water jet, sand jet, or the like.

Each of the conventional demolition methods has both merits and demerits. A comparative study can be made on the merits and demerits of the various demolition methods, the structure and size of the object to be demolished, environmental concerns, and other factors, to collectively evaluate the demolition methods for a particular structure. Then, a demolition method best suited for that structure can be employed. However, in the case of demolishing concrete at a high efficiency, the proposed methods involve the occurrence of a secondary problem due to the noise, flying dust and chips, and the like.

SUMMARY OF THE INVENTION

It is an object of the present invention to provide a method and an apparatus which can demolish a concrete structure at a high efficiency while preventing a secondary problem due to noise, flying dust and chips, and the like.

According to the present invention, a concrete demolishing method which melts a surface of a concrete structure comprises: generating a plasma arc from the plasma torch of a plasma arc generator, mixing thermite powder with a supply gas for the plasma torch, passing the mixture of thermite powder and supply gas to the plasma arc, directing the plasma arc at the surface of the concrete structure, and controlling the rate of supply of the thermite powder to the plasma arc in response to the operation of the plasma torch, preferably including initiating and stopping the supply of the thermite powder to the plasma arc in a manner coordinated with the initiation and stoppage of the plasma arc, thereby controlling the heat generated by the thermite reaction and melting at least a portion of the surface of the concrete structure.

In addition to mixing the thermite powder with the supply gas for the plasma torch, at least one material selected from the group consisting of agents to control a thermite reaction starting temperature and agents to lower the melting point of concrete can be included as an ingredient of the mixture.

An anodic dummy electrode can be positioned on the surface of the concrete structure between the surface and the plasma torch, and moved in a manner simultaneously corresponding to the movement of the plasma torch. A plasma arc is generated to the dummy electrode, and the mixture of supply gas and thermite powder with or without additional ingredients is jetted into the resulting plasma arc environment.

Also, according to the present invention, a concrete demolishing apparatus which melts the surface of a concrete structure comprises a plasma generator equipped with a plasma torch for generating a plasma arc, means for mixing thermite powder with a supply gas for the plasma torch and for passing the resulting mixture to the plasma arc, and control means for controlling the rate of supplying the thermite powder to the plasma arc in response to the operation of the plasma torch, preferably including initiating and stopping the supply of the thermite powder to the plasma arc in a manner coordinated with the initiation and stoppage of the plasma arc, thereby controlling the heat generated by the thermite reaction and melting at least a portion of the surface of the concrete structure. A passageway for the mixture of supply gas and thermite powder can be provided within the plasma torch or along the periphery thereof so that the mixture is injected into the plasma arc environment.

The means for mixing thermite powder with a supply gas for the plasma torch can include means for adding to the supply gas at least one material selected from the group consisting of agents to control a thermite reaction starting temperature and agents to lower the melting point of concrete. Moreover, an anodic dummy electrode can be positioned on the surface of the concrete structure between the surface and the plasma torch, and the dummy electrode and the plasma torch can be moved simultaneously in a corresponding manner.

According to the concrete demolishing method and apparatus of the present invention, the heat of the generated plasma arc causes the thermite powder to ignite, inducing a thermite reaction, and the thermite reaction heat and the plasma arc heat synergize each other to efficiently melt the concrete surface. The intensity of the thermite reaction heat can be easily controlled by controlling the rate of supply of the thermite powder to the plasma arc environment. Also, the thermite reaction can be easily stopped either by ceasing the supplying of the thermite powder or by extinguishing the plasma arc.

By skillfully combining a plasma arc demolition method, which is compact and easy to carry out under electrical control but which is poor in thermal efficiency when applied to nonconducting concrete, and a thermite demolition method, which provides a large quantity of heat but in which the thermite reaction is difficult to control, their merits not only offset their demerits but synergize each other. Needless to say, an essential feature of both methods, i.e., a reduced occurrence of the secondary problem of noise, flying dust and chips, and the like is maintained intact in the combination.

BEST MODE FOR CARRYING OUT THE INVENTION

Figure 1:
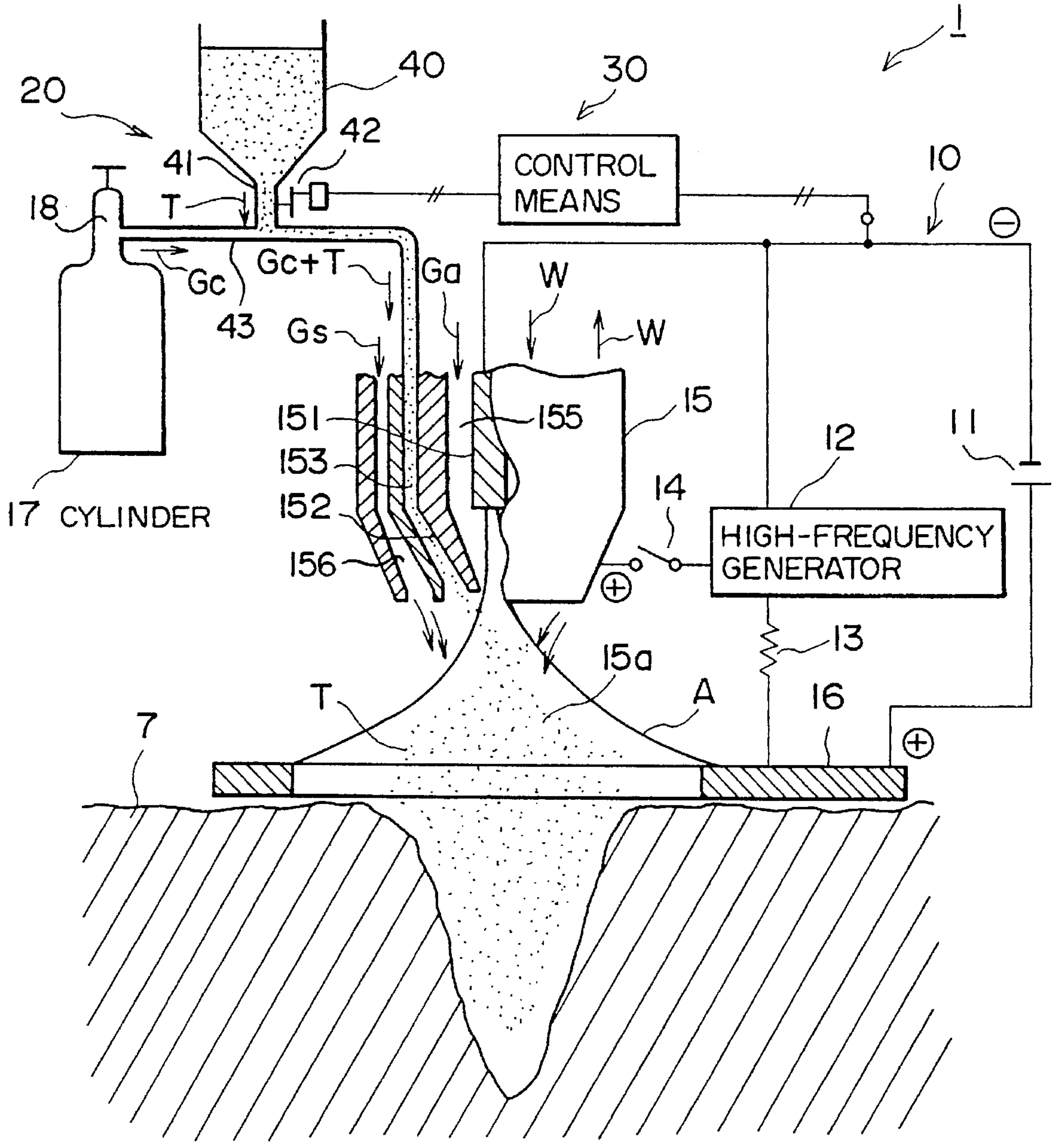
FIG. 1 is a diagrammatic view which illustrates a concrete demolishing apparatus according to a first embodiment of the present invention.

A concrete demolishing apparatus according to a first embodiment of the present invention will now be described with reference to FIG. 1.

A plasma generator 1 is provided with a plasma torch 15 containing a centrally located electrode (cathode) 151 and an annular nozzle electrode (anode) 152 which surrounds at least a portion of the centrally located electrode 151. An annular dummy electrode (anode) 16 is positioned on a surface of a concrete structure 7 to be demolished. The plasma generator 1 is also provided with a power circuit 10 which comprises an actuatable direct current power source 11 having its negative terminal connected to centrally located electrode 151 and its positive terminal connected to the dummy electrode 16, a high-frequency generator 12 and a pilot arc current adjusting resistance 13 connected in series between the negative terminal of the direct current power source 11 and the dummy electrode 16, and a main arc selector switch 14 connected between the high-frequency generator 12 and the nozzle electrode 152.

The plasma generator 1 is also provided with a feeding apparatus 20 for supplying thermite powder T to the plasma arc, the feeding apparatus 20 comprising a cylinder 17 having a pressure regulated valved outlet 18 for supplying a carrier gas Gc at a desired pressure, a hopper 40 having an outlet conduit 41 containing a valve 42 for supplying thermite powder T, a carrier gas passageway 153 provided in the plasma torch 15, and a conduit 41 connecting the valved outlet 18 of the cylinder 17 and the valved outlet conduit 41 of the hopper 40 to the carrier gas passageway 153. The carrier gas passageway 153 is located in the plasma torch 15 so as to eject the mixture of thermite powder T and carrier gas Gc from the passageway 153 into the plasma arc A.

An input terminal of a control means 30 is connected to the wiring between the direct current source 11 and the electrode 151 to provide control means 30 with a signal representative of the operation of the plasma torch 15. The control means 30 manipulates valve 42 in the hopper outlet conduit 41 so as to vary the rate of introduction of the thermite powder T from the hopper 40 into the carrier gas passing through conduit 43 in accordance with the operation of the plasma torch 15, including initiating and stopping the supply of the thermite powder to the plasma torch via the conduit 43 in a manner coordinated with the initiation and stoppage of the plasma arc A.

As seen from the fact that an inlet for actuating gas Ga, an inlet for shield gas Gs, and an inlet and an outlet for cooling water W, are provided, the plasma torch 15 is of the shield gas type and of the water cooling type. Thus, the plasma generator 1 is also supplied with the actuating gas Ga, the shield gas Gs, and the cooling water W, all from sources not shown. When the carrier gas Gc, the actuating gas Ga, and the shield gas Gs are not distinguished from each other, they will hereinafter be called supply gas G.

Operations of the first embodiment will now be described. The actuating gas Ga is initially supplied to the passageway 155 between the central electrode 151 and the nozzle electrode 152 of the plasma torch 15 as a preflow. After the flow of actuating gas Ga between the central electrode 151 and the nozzle electrode 152 has been established, electrical current is applied to the high-frequency generator 12 to cause a dielectric breakdown in the actuating gas Ga between the central electrode 151 and the nozzle electrode 152, thereby forming a pilot arc. The actuating gas Ga, which has been ionized by the pilot arc and has become conductive, is jetted out through the nozzle 15 and reaches the dummy electrode (anode) 16 to generate a plasma arc (main arc) A. Then, the main arc selector switch 14 is turned off to stably maintain the plasma arc A. The shield gas Gs is fed through an annular passageway 156 to provide an annular gas shield surrounding the plasma arc A.

Since the dummy electrode 16 is in the form of a ring, the plasma arc A has a conical shape like Mt. Fuji. When the mixture, Gc+T, of carrier gas Gc and thermite powder T is jetted into the plasma arc atmosphere 15*a* within the plasma arc A, the heat of the plasma arc A causes the thermite powder T to induce the thermite reaction, thereby producing additional heat and melting the surface of the concrete structure 7 exposed by the opening of the annular dummy electrode 16. Since a driving apparatus, not shown, causes the dummy electrode 16 to move in a manner corresponding to the simultaneous movement of the plasma torch 15, the concrete is continuously melted, forming a groove along the path of movement of the plasma torch 15.

The intensity of the thermite reaction is adjusted or stopped under instructions from the control means 30 which manipulates valve 42 to control the rate of supplying the thermite powder T from the hopper 40 to the supply gas G in conduit 43. The thermite reaction can also be stopped by stopping the operation of the plasma generator 1, for example, by actuating the direct current power source 11 to its off condition.

Also acceptable is the following method for terminating the thermite reaction: the plasma torch 15 is moved away from the dummy electrode 16, i.e., the torch height is changed, until the voltage of the plasma generator 1 exceeds a set working voltage. The plasma generator voltage is detected by a voltage sensor and compared to the set working voltage, and the occurrence of the plasma generator voltage exceeding the set working voltage is used as a trigger for closing valve 42 and thereby terminating the supplying of the thermite powder T to the plasma torch 15.

Examples of applications of the present invention are hereinafter described.

(1) The thermite powder T can be mixed with the actuating gas Ga or with the shield gas Gs, instead of with the carrier gas Gc. Since the thermite powder T is finely divided particulates, the thermite powder T can be mixed with the actuating gas Ga for some sizes (specifications) of the plasma torch 15.

(2) Various gases can be employed as a supply gas G to the plasma generator 1. For example, oxygen, nitrogen, air, hydrogen, a mixture of argon and hydrogen, a mixture of nitrogen and hydrogen, a mixture of oxygen, nitrogen and hydrogen, or the like can be used as the supply gas G.

(3) The means for mixing the thermite powder T with the carrier gas Gc is not limited to the hopper 40 and valve 43. Any apparatus capable of quantitatively mixing the thermite powder T with the carrier gas Gc is acceptable, such as a vacuum type apparatus or a vibrating type apparatus.

(4) The dummy electrode 16 is provided because it greatly increases the amount of the concrete which is melted. Preferably, the dummy electrode 16 is of a material with good electrical and thermal conductivities, such as carbon plate and copper plate, and has a structure allowing forced cooling. Also, a consumable iron plate or the like can be used as the dummy electrode 16 for melting concrete therewith.

Figure 2:
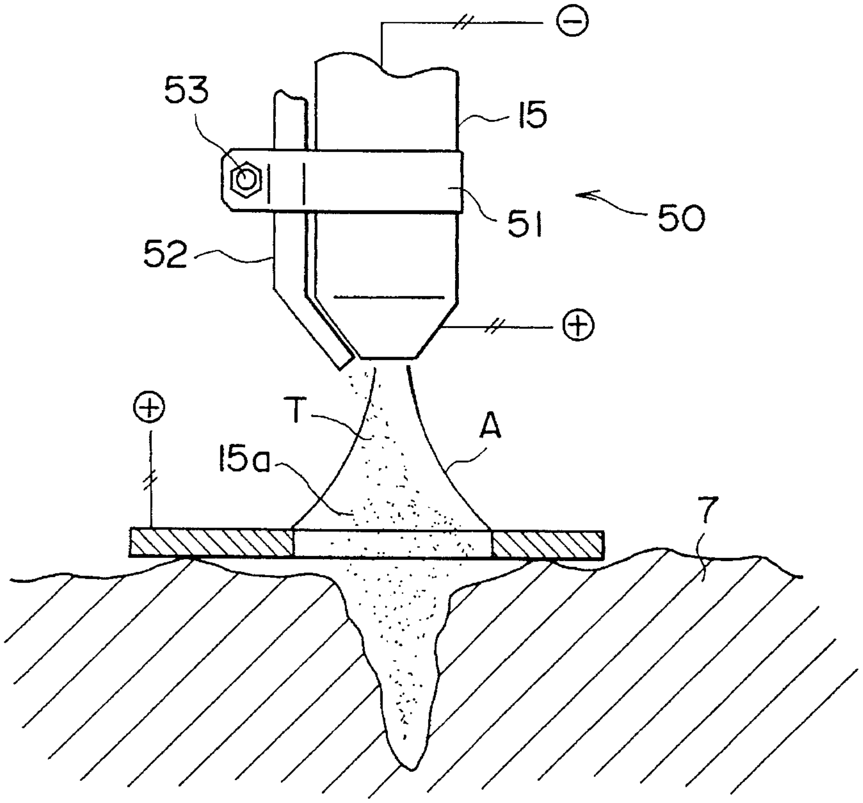
FIG. 2 is a diagrammatic view which illustrates portions of a concrete demolishing apparatus according to a second embodiment of the present invention.

A concrete demolishing apparatus according to a second embodiment of the present invention will now be described with reference to FIG. 2. As the components of the second embodiment which are the same as components in the first embodiment bear the same reference numerals and symbols, a detailed description thereof is omitted. The second embodiment is different from the first embodiment in that the plasma torch 15 of the plasma generator 50 is provided with an externally mounted nozzle 52 which jets or stops jetting the mixture of carrier gas Gc and thermite powder T from conduit 43 toward the plasma arc atmosphere 15a. The nozzle 52 is mounted along the external periphery of the lower end portion of the plasma torch 15 by a band 51 which encompasses the plasma torch 15, with the ends of the band 51 being secured by a bolt 53. In other words, the nozzle 52 is an external passageway which is separate from the internal gas passageways in the plasma torch 15. The action of the nozzle 52 is the same as the internal passageway 153 in the first embodiment. In the second embodiment, the control means 30 manipulates the valve 42 in such a manner as to control the rate of supply of the thermite powder T to the nozzle 52 in response to the operation of the plasma arc, preferably including initiating and stopping the supply of the thermite powder T to the nozzle 52 in a manner coordinated with the initiation and stoppage of the plasma arc. If desired, a switch can be utilized to apply a signal to control means 30 to initiate the injection of the thermite powder T into the supply gas G after the plasma arc has been initiated. The switch can be a manually actuatable switch or it can be actuated automatically at a predetermined delay after the initiation of the plasma arc.

A concrete demolishing method according to a third embodiment of the present invention will now be described. The third embodiment is particularly suited for a small-scale demolition of concrete, such as a preliminary or initial demolition of concrete. After the surface of the concrete structure has been melted by the concrete demolishing apparatus to form a groove, the concrete structure is demolished by driving a power splitter or the like into the thus formed groove.

Since the present invention uses arc discharge, it is also applicable to a large scale demolition of a concrete structure. For example, a large concrete demolishing apparatus having two large electrodes, a control system, and a nozzle which jets or stops jetting the mixture of supply gas G and thermite powder T between the large electrodes in such a manner as-to interlock with the generation and stoppage of a voltage applied to the large electrodes. The two large electrodes are positioned in close proximity to a surface of a concrete structure. Then, an arc discharge is induced between the two large electrodes, and at the same time or after a brief predetermined delay the mixture of supply gas G and thermite powder T is jetted into the arc atmosphere toward the surface of the concrete structure. As a result, the portion of the concrete structure at which the thermite powder T is directed is quickly melted. A concrete structure having a thickness of several meters can be immediately melted by this method.

A presently preferred embodiment of the invention, wherein the thermite powder T has added thereto at least one material selected from the group consisting of agents to control a thermite reaction starting temperature and agents to lower the melting point of concrete, will now be described.

(1) Agents to control thermite reaction starting temperature

Thermite powder T is basically a mixture of finely-divided metallic aluminum and ferric oxide that, when ignited, produces extremely high temperatures as the result of the union of the aluminum with the oxygen of the oxide. The thermite reaction on the surface of a concrete structure is so intensive that it easily melts concrete and rock with a melting point in the range of about 1200 to about 2500° C. However, the finer the particulate size of the thermite powder T, the more the thermite powder T tends to induce dust explosion at a room temperature. This tendency is stronger than that of iron dust, coal dust, or the like. Hence, from a safety point of view, it is essential to provide means for externally controlling the start and the stop of the thermite reaction. Also, it is desirable to use the thermite powder T itself for controlling the start of the thermite reaction.

In detail, it is desirable that the thermite powder T be admixed with a material such that the occurrence of the thermite reaction be prevented or minimized at temperatures up to 1000° C. To attain this object, in addition to a consideration of the grain size of each ingredient of the thermite powder T and the characteristics of the supply gas G and other factors, an agent to control a thermite reaction starting temperature is added to the thermite powder T in advance. The additional agent or agents can be premixed with the thermite powder T in the hopper 40, or one or more separate feeding mechanisms can be employed for adding the additional agent or agents to the supply gas. Any suitable temperature controlling agent can be utilized. Suitable temperature controlling agents include the powders of iron, nickel, manganese, carbon, calcium, magnesium, barium, zirconium, copper, and admixtures of any two or more thereof. For securing safety, it is quite important to control the thermite reaction starting temperature by studying the temperature controlling agents and their grain size and compounding ratios, the characteristics of the supply gas G and others so that the thermite reaction occurs at a desired temperature.

(2) Agents to lower the melting point of concrete

When melting concrete, the plasma torch can face not only horizontally or upwardly but downwardly in many cases. Molten concrete is high in viscosity, and hence does not naturally flow out of a groove in a generally horizontal surface. When melting concrete with the plasma torch facing downwardly, it is desirable that the plasma torch be equipped with a gas nozzle to blow such molten substance (dross) out of the groove. However, since concrete can contain gravel with a melting point higher than that of the concrete, the gas jetted from the gas nozzle may not be able to blow out both the gravel and the molten concrete. As a consequence, a desired progress of the melting process is difficult to achieve.

In order to blow out such gravel as well as the molten concrete, the viscosity of the molten concrete needs to be low. To attain this object, a substance which lowers the melting point of the concrete when it melts and mixes with molten concrete, is added to the thermite powder T in advance. The additional agent or agents can be premixed with the thermite powder T in the hopper 40, or one or more separate feeding mechanisms can be employed for adding the additional agent or agents to the supply gas G. Such agents to lower the melting point of concrete include aluminum, magnesium, iron, sodium, lead oxide, chlorides like sodium chloride, fluorides like fluorite, and admixtures of any two or more thereof.

The effect of agents to control a thermite reaction starting temperature and agents to lower the melting point of concrete will now be described with reference to specific test results.

The test apparatus is the plasma generator 1 in FIG. 1. Admixed with the thermite powder T is an agent to lower a thermite reaction starting temperature, which agent comprises manganese and carbon, and an agent to lower the melting point of concrete, which agent comprises fluorite. The maximum grain size of these agents is about 100 microns. The carrier gas Gc for the mixture of thermite powder T and the agents is a mixture of oxygen, hydrogen, and nitrogen. The feed rate of the mixture of thermite powder T and the agents is in the range of 10 to 100 grams/minute. The plasma intensity is in the range of about 40 to about 200 kW (this range of plasma intensity derives from the fact that the feed rate of the thermite powder T is variable). The concrete is a hardened mixture of pebbles with a diameter of about 20 mm, sand, and portland cement. The plasma torch faces downward in melting, and molten concrete is blown out of the resulting groove by the carrier gas Gc.

Figure 3:
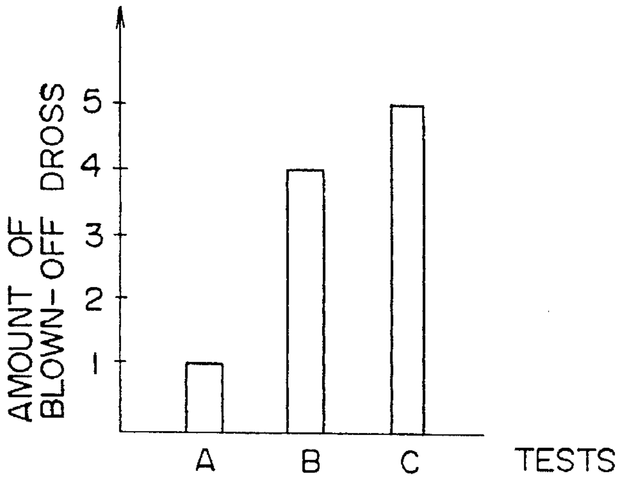
FIG. 3 is a graph which illustrates test results on the amount of blown-off dross for tests A, B and C.
Figure 4A:
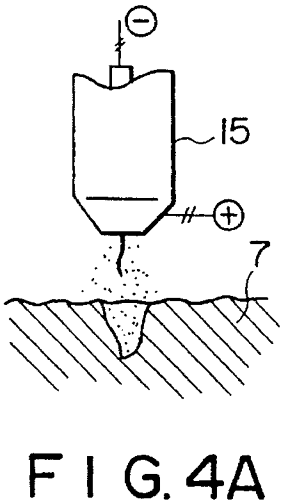
FIG. 4A is a diagrammatic view which illustrates portions of an apparatus used for test A in FIG. 3.
Figure 4B:
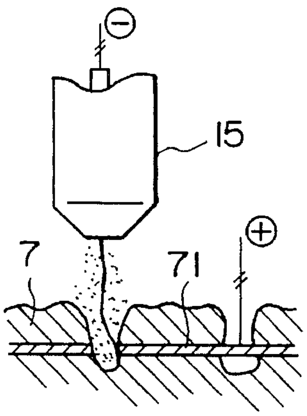
FIG. 4B is a diagrammatic view which illustrates portions of an apparatus used for test B in FIG. 3.
Figure 4C:
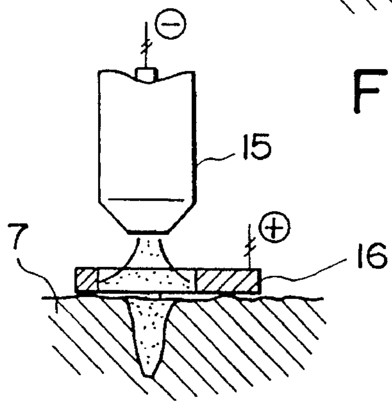
FIG. 4C is a diagrammatic view which illustrates portions of an apparatus used for test C in FIG. 3.

FIG. 3 shows the test results for comparison. In comparison of the amount of blown-off dross, tests A, B and C show the relationship of A:B:C=1:4:5. In test A, as shown in FIG. 4A, there is no plus ground on the concrete surface 7 (so-called nontransfer type in plasma control). In test B, as shown in FIG. 4B, a plus ground is made by a metal reinforcement element 71 embedded in the concrete (so-called transfer type in plasma control). In test C, as shown in FIG. 4C, a plus ground is made by the dummy electrode 16 (present invention). According to the test results, test C shows the largest amount of blown-off dross.

Figure 5:
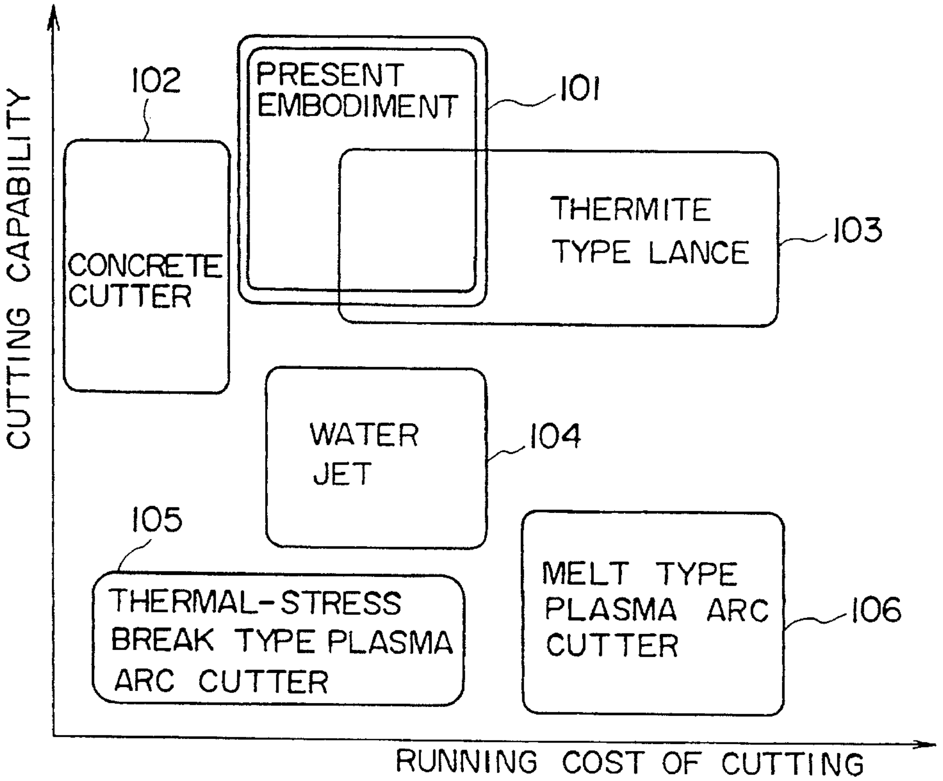
FIG. 5 is a graph which illustrates the comparison of cutting capability and the running cost of cutting between an embodiment of the present invention and various prior art methods.

FIG. 5 is a graph which illustrates the comparison of the cutting capability and the running cost of cutting between the present invention 101 and conventional concrete demolishing techniques 102–106.

In detail, the present invention 101 is free of a potential fire because of the capability of controlling the heating, and does not produce any noise. Because of a good thermal efficiency, the present invention is applicable to both small-sized and large-sized concrete demolishing apparatus. The present invention also shows a high cutting capability and a low running cost of cutting.

The concrete cutter 102 is low in running cost of cutting, but produces a large amount of noise.

The thermite type lance 103 is high in cutting capability, but provides difficulty in controlling the heating, and has the danger of a potential fire.

The water jet 104 has a problem of having to dispose of the water used.

The thermal-stress break type plasma arc cutter 105 is poor in breaking efficiency, and hence requires a secondary breaking effort.

The melt type plasma arc cutter 106 is poor in thermal efficiency and high in running cost of cutting.

INDUSTRIAL APPLICABILITY

The present invention is effective to serve as a method and an apparatus which can prevent a secondary problem due to noise, flying dust and chips, and the like, and can demolish concrete at a high efficiency.

What is claimed is:

1. A method of demolishing a concrete structure, comprising the steps of:

generating a plasma arc from a plasma torch of a plasma arc generator, mixing thermite powder with a supply gas for said plasma torch, passing the resulting mixture into the thus generated plasma arc, directing the plasma arc containing said mixture toward a surface of the concrete structure, and controlling the supplying of said thermite powder to the plasma arc responsive to the operation of the plasma torch, thereby melting at least a portion of the surface of the concrete structure.

2. A method in accordance with claim 1, wherein the step of controlling comprises varying the rate of addition of the hermite powder to the supply gas in response to the operation of the plasma torch.

3. A method in accordance with claim 1, wherein said step of controlling comprises manipulating the rate of supplying the thermite powder to the plasma arc in response to the operation of the plasma torch, including initiating and stopping the supplying of the thermite powder to the plasma arc in a manner coordinated with the initiation and stoppage of the plasma arc, thereby controlling the heat generated by the thermite reaction.

4. A method in accordance with claim 3, wherein the step of manipulating comprises varying the rate of addition of the thermite powder to the supply gas in response to the operation of the plasma torch.

5. A method in accordance with claim 1, wherein said step of controlling includes initiating and stopping the supplying of said thermite powder to the plasma arc in a manner coordinated with the initiation and stoppage of the plasma arc.

6. A method in accordance with claim 1, wherein said step of mixing comprises mixing said thermite powder, said supply gas, and at least one material selected from the group consisting of agents to control a thermite reaction starting temperature.

7. A method in accordance with claim 1, wherein said step of mixing comprises mixing said thermite powder, said supply gas, and at least one material selected from the group consisting of agents to lower the melting point of concrete.

8. A method in accordance with claim 1, wherein said steps of generating a plasma arc from said plasma torch and directing the plasma arc containing said mixture toward a surface of the concrete structure comprise:

positioning an anodic dummy electrode on said surface between said surface and said plasma torch, and generating said plasma arc to said dummy electrode.

9. A method in accordance with claim 8, further comprising simultaneously moving said dummy electrode and said plasma torch in a corresponding manner.

10. A method in accordance with claim 9, wherein the step of controlling comprises varying the rate of addition of the thermite powder to the supply gas in response to the operation of the plasma torch.

11. A method in accordance with claim 9, wherein said step of controlling comprises manipulating the rate of supplying the thermite powder to the plasma arc in response to the operation of the plasma torch, including initiating and stopping the supplying of the thermite powder to the plasma arc in a manner coordinated with the initiation and stoppage of the plasma arc, thereby controlling the heat generated by the thermite reaction.

12. A method in accordance with claim 11, wherein the step of manipulating comprises varying the rate of addition of the thermite powder to the supply gas in response to the operation of the plasma torch.

13. A method in accordance with claim 9, wherein said step of controlling includes initiating and stopping the supplying of said thermite powder to the plasma arc in a manner coordinated with the initiation and stoppage of the plasma arc.

14. A method in accordance with claim 9, wherein said step of mixing comprises mixing said thermite powder, said supply gas, and at least one material selected from the group consisting of agents to control a thermite reaction starting temperature.

15. A method in accordance with claim 9, wherein said step of mixing comprises mixing said thermite powder, said supply gas, and at least one material selected from the group consisting of agents to lower the melting point of concrete.

* * * * *